US009685878B2

(12) United States Patent
Balda et al.

(10) Patent No.: US 9,685,878 B2
(45) Date of Patent: Jun. 20, 2017

(54) AC LINE CONNECTOR WITH INTERMEDIATE DC LINK

(71) Applicant: BOARD OF TRUSTEES OF THE UNIVERSITY OF ARKANSAS, Little Rock, AR (US)

(72) Inventors: Juan Carlos Balda, Fayetteville, AR (US); Andres Escobar Mejia, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 195 days.

(21) Appl. No.: 14/558,439

(22) Filed: Dec. 2, 2014

(65) Prior Publication Data

US 2015/0155716 A1  Jun. 4, 2015

Related U.S. Application Data

(60) Provisional application No. 61/911,461, filed on Dec. 3, 2013.

(51) Int. Cl.
| | |
|---|---|
| *H02M 7/757* | (2006.01) |
| *H02M 5/458* | (2006.01) |
| *H02M 7/48* | (2007.01) |
| *H02M 7/483* | (2007.01) |

(52) U.S. Cl.
CPC ....... *H02M 5/4585* (2013.01); *H02M 7/4807* (2013.01); *H02M 7/7575* (2013.01); *H02M 2007/4835* (2013.01); *Y02E 60/60* (2013.01)

(58) Field of Classification Search
CPC .................... H02M 7/7575; H02M 2007/4835

USPC .... 363/1–10, 17, 34–37, 131, 132, 148–165
See application file for complete search history.

(56) References Cited

U.S. PATENT DOCUMENTS

| | | | | |
|---|---|---|---|---|
| 4,812,729 A * | 3/1989 | Ito | ........................ | H02H 7/1216 318/732 |
| 5,710,699 A * | 1/1998 | King | ..................... | B60L 11/005 318/139 |
| 6,069,800 A * | 5/2000 | Cross | .................. | H02M 1/4258 363/20 |
| 7,227,277 B2 * | 6/2007 | Chapman | .................. | H02J 1/10 307/43 |
| 7,944,723 B2 * | 5/2011 | Crane | ................... | H02M 7/219 323/239 |
| 8,089,780 B2 * | 1/2012 | Mochikawa | ............ | H02M 1/08 363/132 |
| 8,270,186 B2 * | 9/2012 | Sakakibara | ........... | H02M 5/271 363/131 |
| 8,288,887 B2 * | 10/2012 | Ransom | .............. | B60L 11/1811 307/10.1 |
| 8,462,528 B2 * | 6/2013 | Kajouke | ............. | B60L 11/1811 363/127 |
| 8,995,159 B1 * | 3/2015 | Carr | ...................... | H02M 5/297 363/10 |

(Continued)

*Primary Examiner* — Adolf Berhane
*Assistant Examiner* — Nusrat Quddus
(74) *Attorney, Agent, or Firm* — Keith A. Vogt; Vogt IP

(57) ABSTRACT

An electric power transmission system and method that provides a power electronic interface system for connecting a plurality of alternating current transmission lines by one or more direct current transmission lines. The system includes dc-link converters, frequency transformers connected to the converters, and multilevel converters are connected to a direct current transmission line.

20 Claims, 11 Drawing Sheets

(56) References Cited

U.S. PATENT DOCUMENTS

| | | | |
|---|---|---|---|
| 2003/0095424 A1* | 5/2003 | Oates | H02J 3/00 363/132 |
| 2004/0022081 A1* | 2/2004 | Erickson | H02M 5/297 363/159 |
| 2009/0102436 A1* | 4/2009 | Escobar Valderrama | H02J 3/1857 323/207 |
| 2010/0091534 A1* | 4/2010 | Tadano | H02M 5/293 363/157 |
| 2012/0113683 A1* | 5/2012 | Perisic | H02M 3/33584 363/17 |
| 2014/0197639 A1* | 7/2014 | Bala | H02J 3/386 290/54 |
| 2015/0124506 A1* | 5/2015 | Sahoo | H02M 5/225 363/126 |

* cited by examiner

AC LINE CONNECTOR WITH INTERMEDIATE DC LINK

RELATED APPLICATIONS

This application claims priority to and the benefit of the filing date of U.S. provisional application Ser. No. 61/911,461 filed Dec. 3, 2013 and incorporated herein for all purposes.

STATEMENT REGARDING FEDERALLY SPONSORED RESEARCH & DEVELOPMENT

This work was supported by GR-11-03 and GR-13-06 with funding by NSF GRAPES I/UCR.

INCORPORATION BY REFERENCE OF MATERIAL SUBMITTED ON A COMPACT DISC

Not applicable.

BACKGROUND OF THE INVENTION

Power transmission using a high-voltage direct current link (HVdc) has been considered for decades to interconnect two points located at a significant distance where this approach becomes more cost effective than alternating current (ac) transmission. Currently, dc transmission is being considered for applications such as connecting two separated ac systems and renewable resources like wind farms to the load centers, particularly, off-shore wind farms. With the development of efficient and faster power electronic components and the reduction in the production cost, the use of dc transmission will increase in the future.

Conventionally, there are two HVdc topologies: thyristor-based line commutated converters (LCCs), and voltage source conveners (VSC), which currently use silicon (Si) isolated gate bipolar transistors (IGBTs). Within the VSC, the modular multilevel converter (MMC), which in general has a half-bridge in each module, has recently become the preferable solution for VSC-HVdc due to its multiple advantages when compared to the other VSC topologies. Regardless of the type of HVdc topology, a three-phase fundamental-frequency transformer is usually used at the ac side to match the ac system.

In the last few decades, high-frequency transformers (HF-XFMR) and medium-frequency transformers (MF-XFMR) have been proposed to replace the fundamental-frequency transformer for utility scale applications. Advantages such as volume and weight reduction make these types of transformers attractive for particular applications when compared with the fundamental-frequency transformer. When these transformers are used, an ac-to-ac converter is required to reduce the HF or MF to utility levels (i.e., 50/60 Hz).

Matrix converters (MC) have been extensively analyzed as an alternative to convert ac-to-ac power without using large energy storage components in the dc link as in the conventional back-to-back converter (BBC). Advantages for these devices are unity of input/output power factor, bidirectional power flow, sinusoidal input current and output voltage, and the lack of a bulky and lifetime-limited electrolytic capacitor in the dc link, which results not only in a substantial converter size reduction, but potentially, in a more reliable system.

There are two types or MCs: conventional matrix converters (CMCs) and indirect matrix converters (IMCs). The CMC uses nine bidirectional switching positions, normally realized as two unidirectional switching devices in either a common-source or common-emitter configuration, to allow a direct connection between the input and the output. The IMC, also called the dual-bridge topology, separates the ac-ac conversion into rectifier and inverter power stages, and thus, allows independent control of the two stages, overcoming the complex MC control requirements. The IMC presented in FIG. 1 has two main stages: an input filter 100 connected to rectifier stage 102 which uses 12 unidirectional devices 103 for applications that require bidirectional capability, such as motor drives or certain distributed generators (e.g., microturbines), and the inverter stage 104 connected to output filter 106 which is a conventional two-level three-phase voltage source converter (VSC) requiring 6 unidirectional switches 108.

Distributed generation systems inject power into the utility system, so the electrolytic capacitors do not play the same role as in the case of a motor drive. Hence, the IMC advantages make it a viable alternative to be considered as a standard power electronic interface (PEI) for distributed generation systems. In general, conventional Si IGBTs and diodes are used to build MCs. Recently, reverse blocking IGBTs (RB-IGBTs), which are considered to be a bidirectional switch, are being used for further size reduction. New wide bandgap power semiconductor devices, such as SiC JFETs and SiC MOSFETs are becoming more competitive for industrial applications that require high power densities and operate in extreme environments. Advantages such as low on-resistance, high temperature capability, reduced cooling requirements, and high breakdown voltages make them the preferable switching devices. The use of SiC devices allows for the increase in converter switching frequency, $f_{sw}$, which helps to reduce size and weight of the overall converter.

BRIEF SUMMARY OF THE INVENTION

In one embodiment, the present invention provides a control technique that does not require sensing the and voltage to regulate the active and reactive power injected into the grid. In another embodiment, the present invention presents an ac-ac topology using the IMC as one of the PEIs but any other converter topology like the conventional BBC may be used. The topology is used to connect two medium-voltage (MV) ac systems through a HV dc-link.

In another embodiment, the present invention provides for a connection of a medium- or high-voltage dc system to a three-phase ac system, and uses two high-voltage dc-link converters based on the MMC, two IMCs and two MF-XFMRs. At the sending-end, the IMC is used to increase the utility frequency to MF (higher frequencies could be also possible). The MF-XFMR is used to step-up the voltage to required levels. Then, the MMC is used as an ac to dc converter. At the receiving-end, the topology is used in reverse order to connect with another ac system.

In another embodiment, same or different frequency grids are connected together through the sending-end and receiving-end of a dc voltage link. At the receiving-end of the link, the MMC is a dc-ac converter that consists of a series of connected sub-modules. The sub-module contains, but is not limited to, a half-bridge topology. Three medium-frequency transformers may be connected in series to step down the voltage in another embodiment of the invention. The IMC then converts the medium-frequency voltage to grid frequency. The IMC is comprised of a bi-directional rectifier stage (for bi-directional power flow) and an inverter stage to match the output voltage level and frequency of the grid. The sending-end topology is the same as the receiving-end except in the reverse order.

The embodiments of the present invention have applications where size, reliability and weight are design parameters. One application for the topology of the invention is to deliver power for offshore oil and gas subsea facilities from either inland power substations or offshore wind farms. The embodiments of the present invention have use in connection with floating platforms, which may require a deep-sea electric distribution power system (DSEDS) for operation. An advantage of the present invention is that there are less passive components. The MMC current and voltage output waveforms are nearly sinusoidal which mean that filters at the input of the MF-XFMR are not required. Furthermore, the IMC eliminates the use of the bulky electrolytic capacitor.

Another advantage of the present invention is volume and weight reduction. The implementation of a MF-XFMR allows for a compact design since the volume of the transformer is inversely proportional to the fundamental frequency. There is also a potential size reduction for the capacitor in each sub-module of the MMC because its size is inversely proportional to the frequency of the connected ac system.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 2:
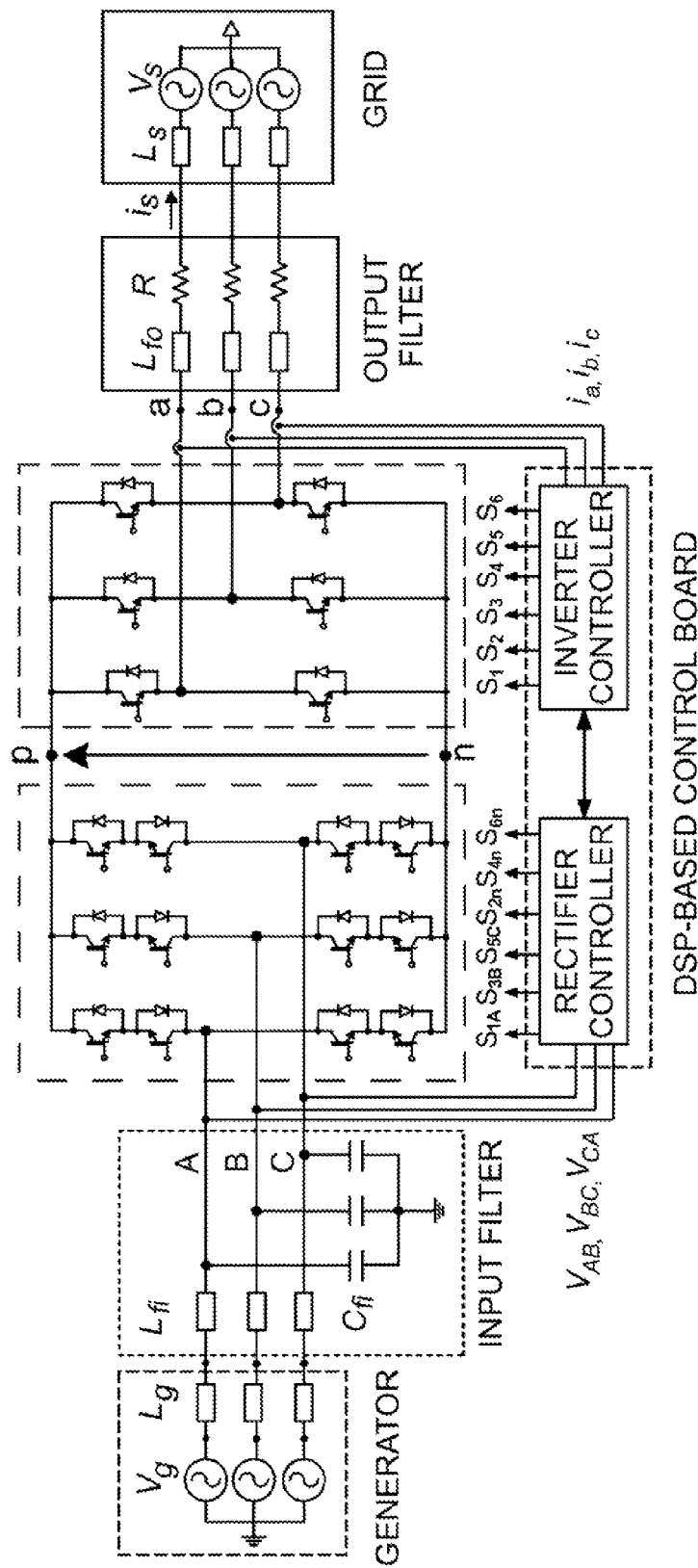
FIG. 2 is a schematic of a control schematic of the IMC for injecting power into the grid.

For the controller of the present invention, sinusoidal input/output waveforms were obtained. In the case of a BBC, the dc-link capacitor decouples the rectifier and inverter stages allowing the implementation of independent controllers. For the IMC, the input and output power must be balanced due to the lack of an electrolytic capacitor resulting in the ability to use one converter to control and regulate power flow. Applying Kirchhoff's voltage law between the inverter of the IMC and the grid as shown in FIG. 2, the voltages in the d-q frame can be written as:

$$\frac{d}{dt}(i_s^d) = \frac{1}{L}(v_{inv}^d - v_s^d) + \omega_o i_s^q \qquad (1)$$

$$\frac{d}{dt}(i_s^q) = \frac{1}{L}(v_{inv}^q - v_s^q) + \omega_o i_s^d,$$

where $\omega_o$ is the grid angular frequency, $L=L_{fo}+L_s$ is the equivalent IMC-grid inductance (i.e., output filter inductance and grid equivalent inductance) and the vectors $i_s^d$, $i_s^q$, $v_s^d$, $v_{inv}^d$, and $v_{inv}^q$ represent the injected current, the grid voltage and the inverter output voltage respectively in the d-q frame. The current is dependent on the cross-coupling terms $\omega_o i_s^d$ and $\omega_o i_s^q$. Eliminating this cross coupling through the control algorithm will improve system response.

Figure 3:
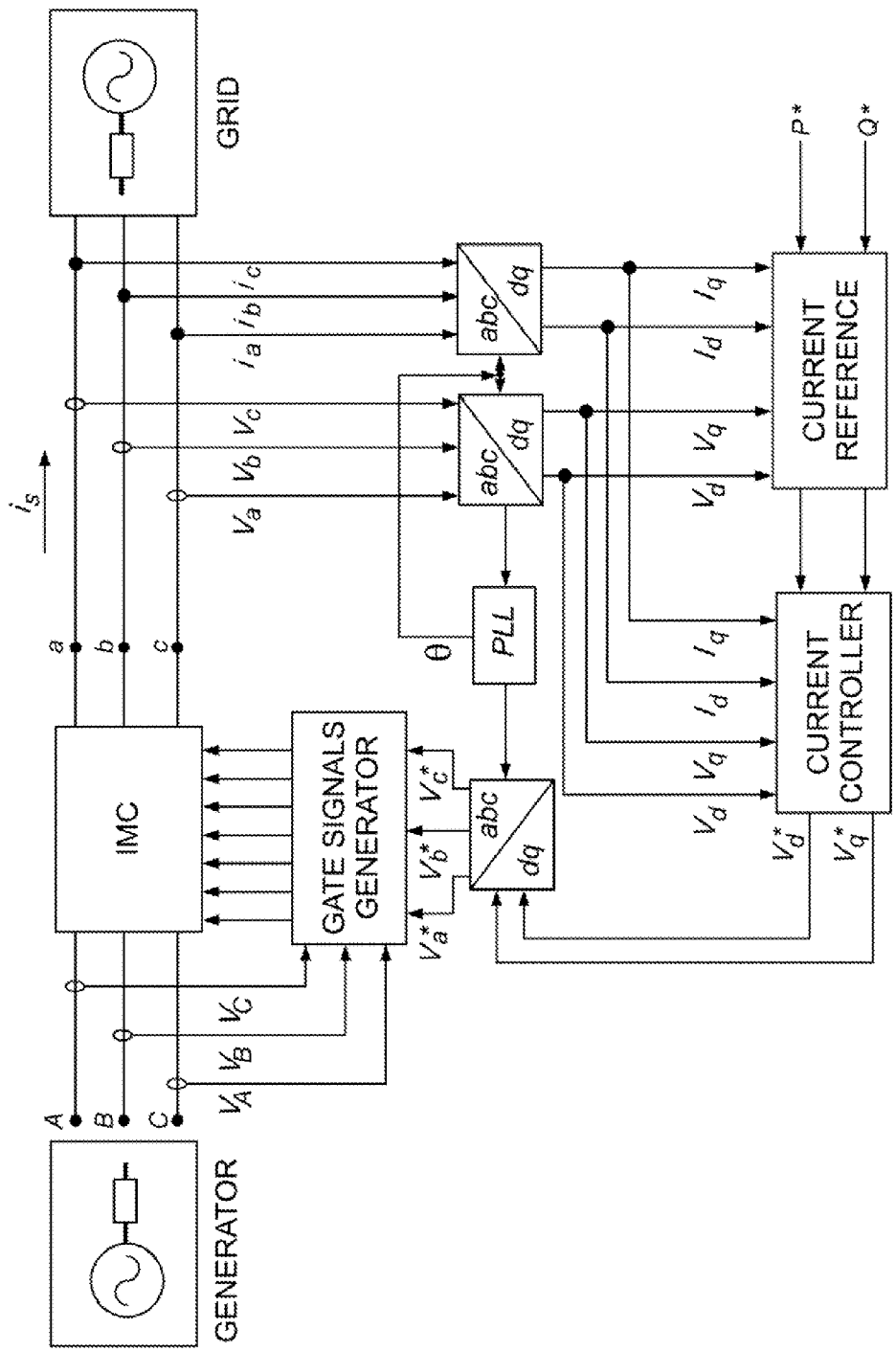
FIG. 3 illustrates how current and voltage measurements are used to regulate the power injected into the grid.

A voltage oriented control technique (VOC) may be used to regulate the active and reactive currents injected. In the case of MCs, several techniques have been proposed to regulate the active and reactive powers injected by the generator using the MC as PEI. As shown in FIG. 3, grid voltages may be sensed to determine the required inverter output voltage. As a result, active and reactive powers injected into the grid may be regulated by varying the magnitude and the angle of the inverter output voltage with respect to the grid.

To avoid sensing the grid voltages and decoupling the dynamics of the d-q axes, the following control technique is proposed:

$$v_{inv}^d = -\frac{As+1}{Bs+g^d}i_s^d - \omega_o L i_s^q \qquad (2)$$

$$v_{inv}^q = -\frac{As+1}{Bs+g^q} i_s^q + \omega_o L i_s^d,$$

where B represents the forward indirect gain, A the forward direct gain, and $g^d$ and $g^q$ are the conductance gains used to determine the current injected into the grid at the desired power factor. The feed-forward terms $\omega_o L i_s^d$ and $\omega_o L i_s^q$ are used to decouple the cross-coupling term in equation (1), and thus, to improve the dynamic response of the system. The terms $v_{inv}^d$ and $v_{inv}^q$ are used to determine the PWM signals controlling the inverter-side power converter. Substituting equation (2) into equation (1) yields, $$i_s^d = -\frac{Bs+g^d}{LBs^2+(Lg^d+A)s+1} v_s^d \quad (3)$$

$$i_s^q = -\frac{Bs+g^q}{LBs^2+(Lg^q+A)s+1} v_s^q.$$

If the transfer function in equation (3) is stable, then, under steady-state conditions (s→0):

$$i_s^d = -g^d v_s^d, \quad i_s^q = -g^q v_s^q. \quad (4)$$

From equation (4), it is possible to conclude that the sign of $g^d$ and $g^q$ determines the power flow direction whereas their magnitude determines the amount of active and reactive powers injected. Space vector pulse-width modulation (SVM-PWM) may be used to modulate both stages. In the rectifier stage, the modulation keeps the dc-link voltage commutating between the largest and the second largest positive line-to-line input voltage. In the inverter stage, the desired inverter output voltage is calculated according to the proposed control block diagram shown in FIG. 4. Section 400 of the diagram concerns reactive power while section 402 concerns active or real powers. The conductance of $g^d$ and $g^q$ are calculated from the output of PI controllers whose inputs correspond to the active and reactive powers delivered by the generator and the reference active and reactive powers.

Figure 4:
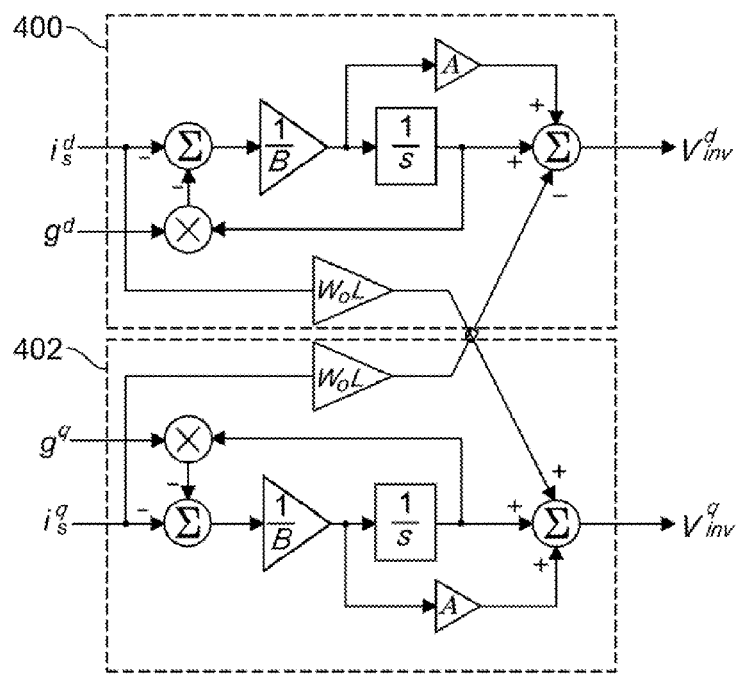
FIG. 4 illustrates a proposed controller for injecting active and reactive power.
Figure 5:
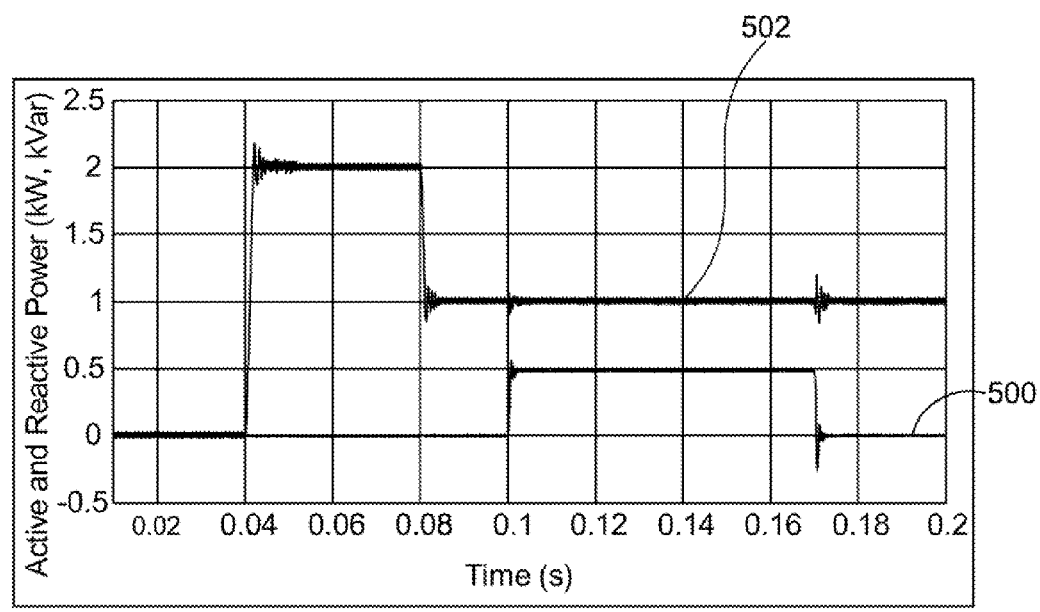
FIG. 5 illustrates active and reactive power variations for changes in the reference.

Simulations in Matlab®/Simulink™ were performed to test the controller shown in FIG. 4. The variations in the active and reactive powers are illustrated in FIG. 5. As shown in FIG. 5, reactive power 500 remains unchanged when active power 502 changes at t=40 ms and 80 ms. At t=100 ms the reference for reactive power 500 changes in order to get a power factor equals to 90% lagging. Small fluctuations in active power 502 occur while reactive power changes 500, however, they are relatively small in magnitude and do not affect the desired power factor. The settling time is under 10 ms with an 8% overshoot for the worst case.

Figure 6:
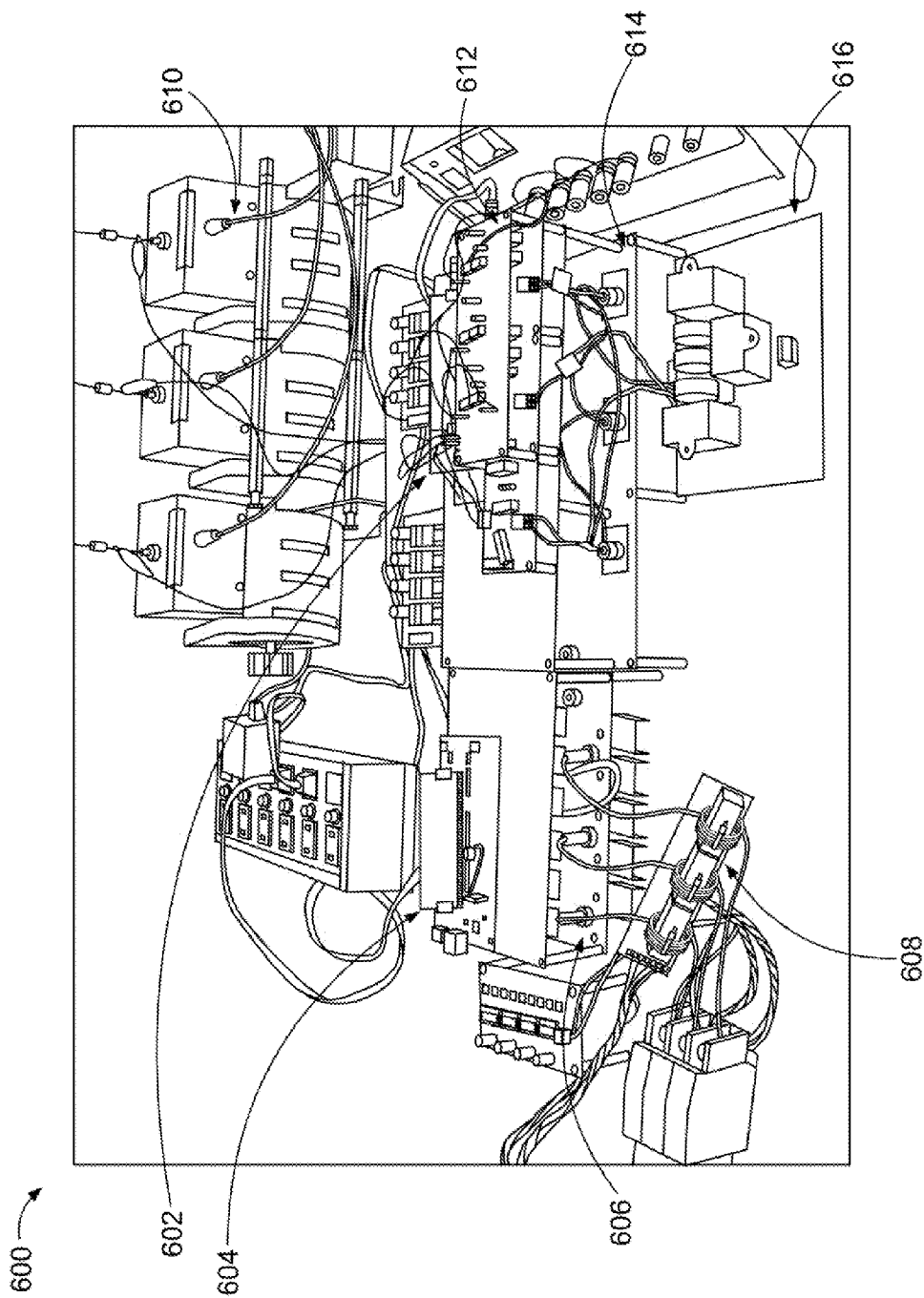
FIG. 6 illustrates an embodiment of the present invention using a Si-based IMC prototype.

After the simulations, experimental results were carried out using prototype 600 as shown FIG. 6. Device 600 includes DSP based controllers 602 and 604, inverter power module 606, current sensor 608, ac grid 610, voltage sensor 612, rectifier power module 614 and input filter 616.

An ac source is connected to the VSC of the IMC whereas the bidirectional current source converter is connected to the grid side. This topology places the zero voltage vector in the VSC in order to boost the input voltage, which is called boost. Only variations in the current reference $i_s^d$ were made during the experimental test ($g^q$=0).

Figure 7A:
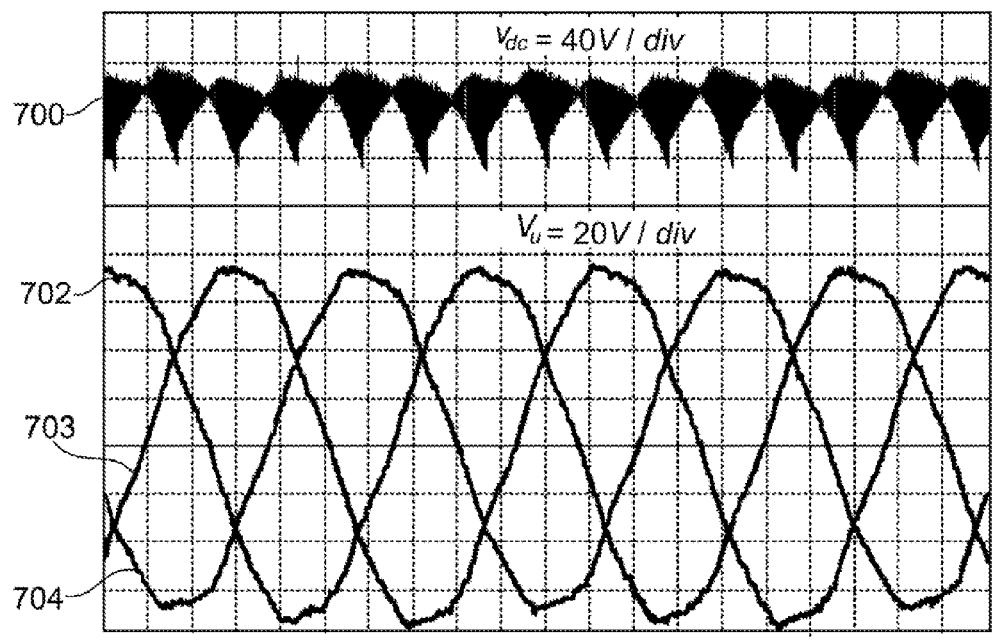
FIG. 7A shows the dc-link voltage and generator output voltage for one embodiment of the invention.
Figure 7B:
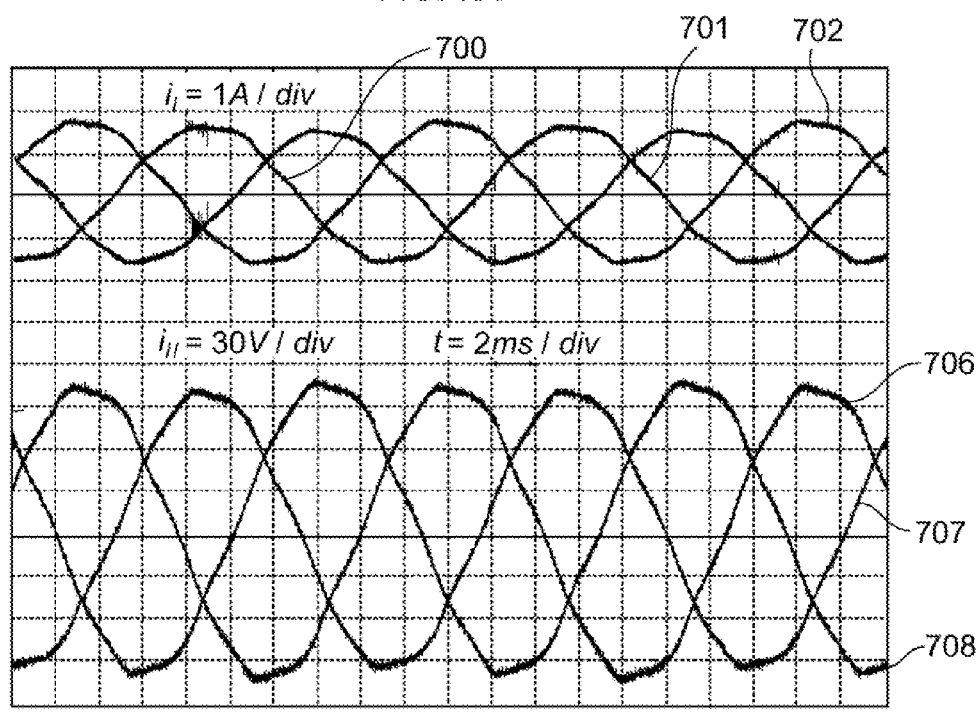
FIG. 7B shows filtered output current injected into the grid and output voltage for one embodiment of the invention.

An ac source generating 50-Vrms at 60-Hz is connected to the IMC input through a 1.5 mH filter. The IMC is then connected to the 208-V grid using an isolation transformer with a 208V/70V voltage ratio. A LC filter ($C_f$=10 uF and $L_1$=1 mH) is used at the output of the IMC for filtering purposes. FIG. 7A shows the dc-link voltage 700, and the line-to-line IMC input voltages 702-704. FIG. 713 shows the measured three-phase current 700-702 injected into the grid and the output voltages of the IMC 706-708. As shown, the input voltage is boosted by a factor of 1.4, and the control technique of the present invention allows the injection of the desired currents. The switching frequency $f_{sw}$ is set to 25 kHz allowing for filter size reductions.

Figure 8:
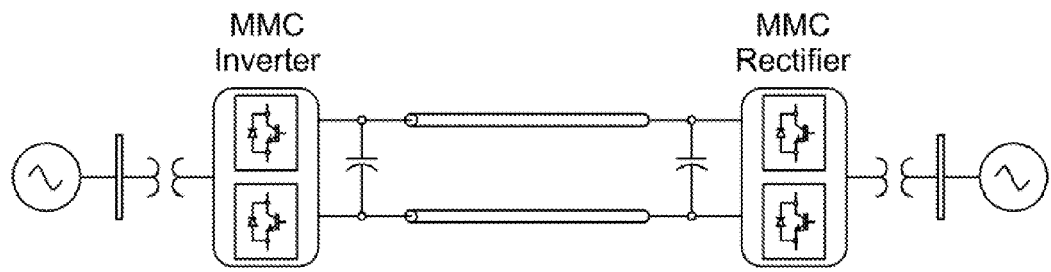
FIG. 8 shows a fundamental-frequency transformer that is used at the ac side to match the grid voltage.

Another aspect of the present invention concerns using high and medium-voltage direct current (HVdc and MVdc) electric power transmission for transmitting power across long distances. Advantages for using dc transmission include lower conduction losses, lower capital cost, and flexibility. Conventionally, there are two HVdc topologies: thyristor-based line commutated converters (LCCs) and voltage source converters (VSCs), which use Silicon (Si) IGBTs. Within the VSC, the modular multilevel converter (MMC), which in general has a half-bridge in each module, as shown in FIG. 9B, has recently become the preferable solution for VSC-HVdc due to its multiple advantages when compared to the other VSC topologies. Regardless the type of HVdc terminal, a fundamental-frequency transformer is used at the ac side to match the grid voltage as shown in FIG. 8.

High-frequency transformers (HF-XFMR) and medium-frequency transformers (MF-XFMR) have been proposed to replace the fundamental-frequency transformer for utility scale applications. Advantages such as volume and weight reduction make these transformers more attractive for particular applications when compared with a fundamental-frequency transformer.

Figure 1:
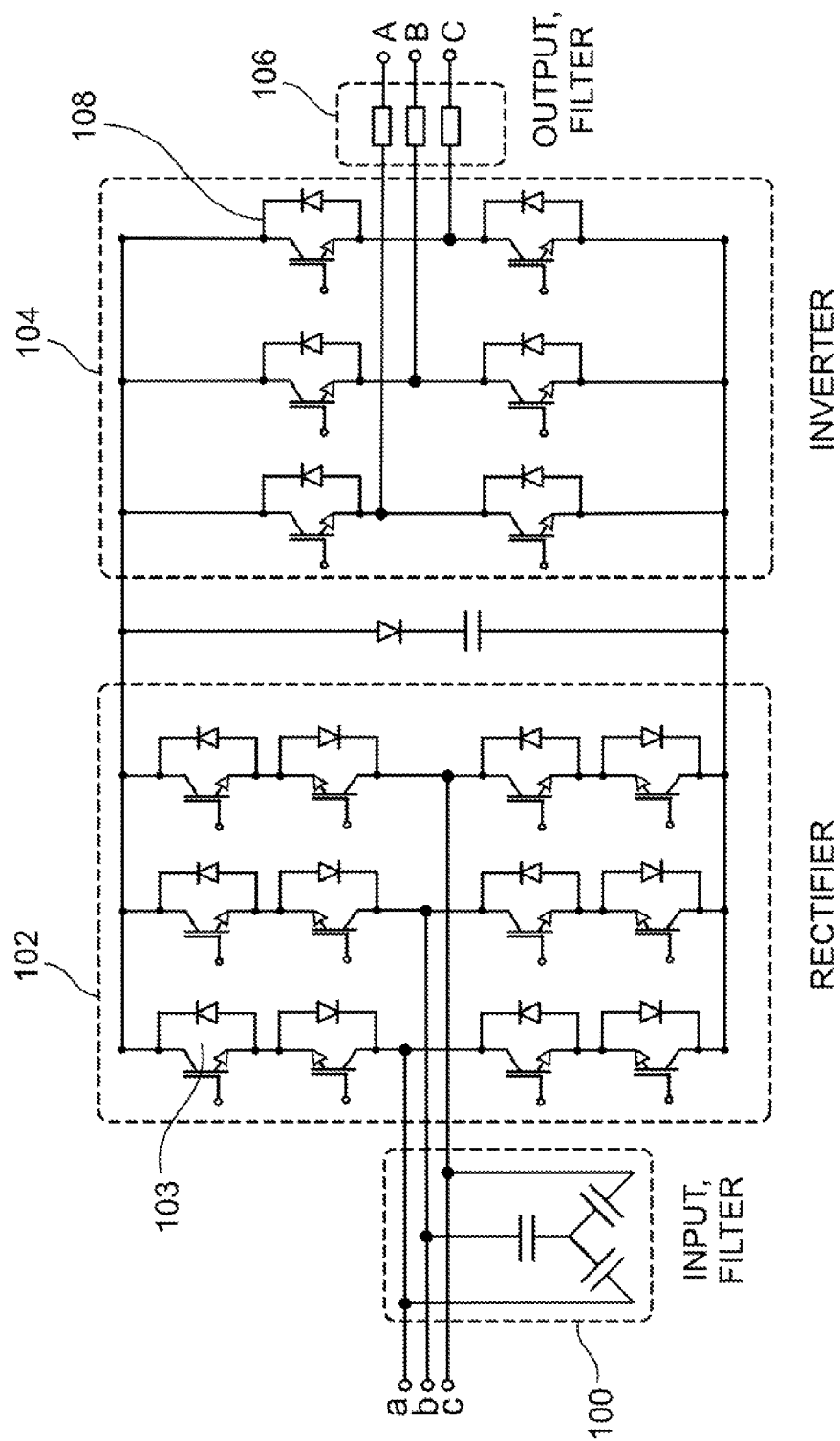
FIG. 1 is a schematic of an IMC topology with a diode and a capacitor in the middle representing a clamp circuit.
Figure 9A:
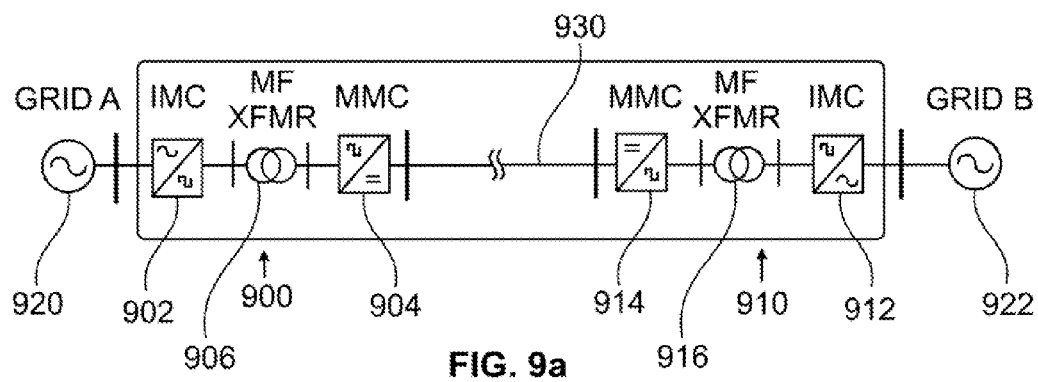
FIG. 9A shows a topology of an embodiment of the present invention used to connect electrical grids.
Figure 9B:
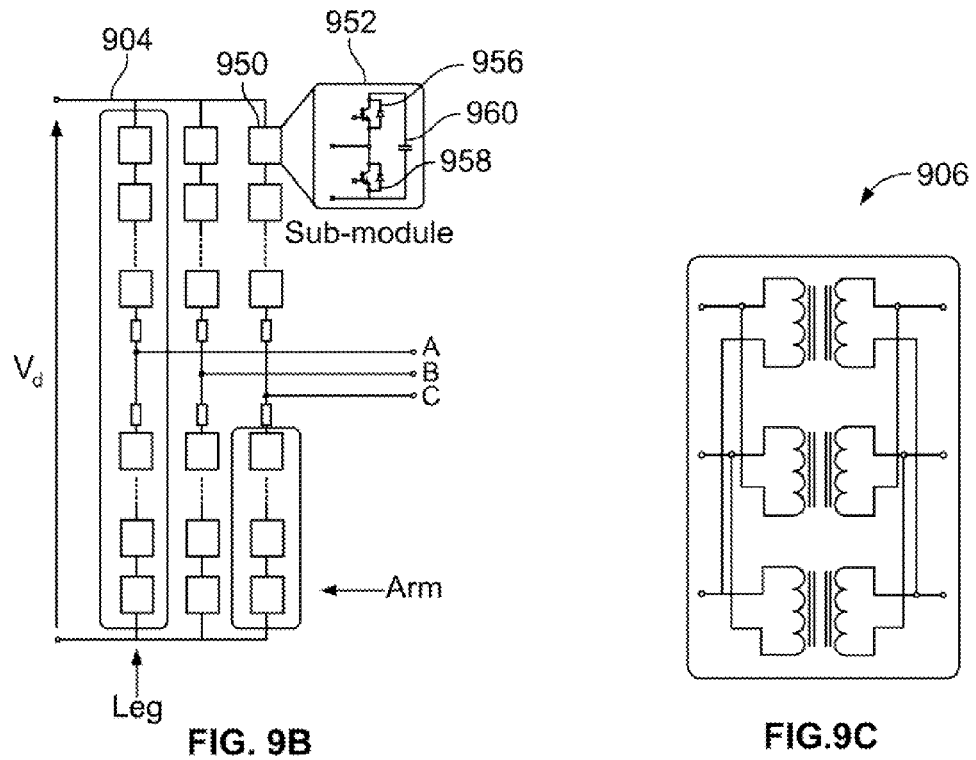
FIG. 9B shows a proposed MMC that may be used with some embodiments of the present invention.
Figure 9C:
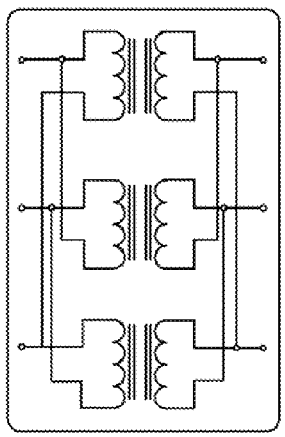
FIG. 9C shows a proposed MF-XFMR used with some embodiments of the present invention

In some embodiments, the present invention provides an ac-ac power electronic interface (PEI) or system as shown FIG. 9A, which uses two high-voltage (HV) dc-link converters 900 and 910 each having an IMC 902 and 912, an MMC 904 and 914 and an MF-XFMR 906 and 916. FIG. 9B shows a proposed MMC used with some embodiments of the present invention having a plurality of sub-modules 950 comprised of half bridge topology 952. Half-bridge submodule 952 consists of two valves, switches or semiconductor devices 956 and 958 and a capacitor 960. FIG. 9C shows a proposed MF-XFMR used with some embodiments of the present invention. FIG. 1 shows a proposed IMC used with some embodiments of the present invention. In an alternate embodiment, any back-to-back converter known to those of skill in the art may be substituted for one or both IMCs 902 and 912.

At sending-end 920 identified as ac Grid A, IMC 902 is used to increase the received grid frequency from utility levels (i.e., 50/60 Hz) to MF, which may be around 3 kHz. MF-XFMR 906 is used to step-up the voltage to required levels, which may be from 13.8 kV to around 45 kV. MMC 906 is used as an ac to dc converter and is connected to high-voltage direct current link 930. At receiving-end 922, the topology is used in reverse order to connect with another ac system or link which is shown as Grid B 922. An advantage of this embodiment of the invention is that it limits the number of passive components used since the MMC current and voltage output waveforms are nearly sinusoidal. This eliminates the need to use filters at the input of MF-XFMRs 906 and 916. Using IMCs 902 and 912 also eliminate the use of the bulky electrolytic capacitors. Implementing MF-XFMRs 906 and 916 also provides for a compact design since the volume of the transformer is inversely proportional to the fundamental frequency. There is also a potential size reduction for the capacitor in each sub-module of the MMC because its size is inversely proportional to the frequency of the connected ac system.

In some embodiments using a half-bridge based MMC, the IMC in the sending-end and the receiving-end operates as a solid-state circuit breaker controlling and/or blocking dc fault currents. In the case of a Si IGBT-based IMC, 3.3 kV devices can withstand 2 to 4× the nominal current for 5-10 us whereas lower voltage IGBTs can withstand 4 to 10× the nominal current during the same time.

For these reasons the PEI of the present invention may be implemented in applications where size, reliability and weight are design parameters. One possible scenario is to deliver power for future offshore oil and gas subsea facilities from either inland power substations or offshore wind farms. The oil and gas industry has shown interest in developing facilities on the seabed due to advantages such as lower operating costs, low-risk operation, and a reduction of harsh weather as compared to floating platforms. These underwater facilities may be located hundreds of kilometers from the shore and will require a deep-sea electric distribution power system (DSEDS) for operation. Deep in the sea, performance and reliability will be a challenge in order to keep the system running at all times. Typical inland substation schemes such as double bus-double breaker, breaker-and-a-half and others will be desirable in future DSEDS to increase flexibility and reliability indices.

Figure 10A:
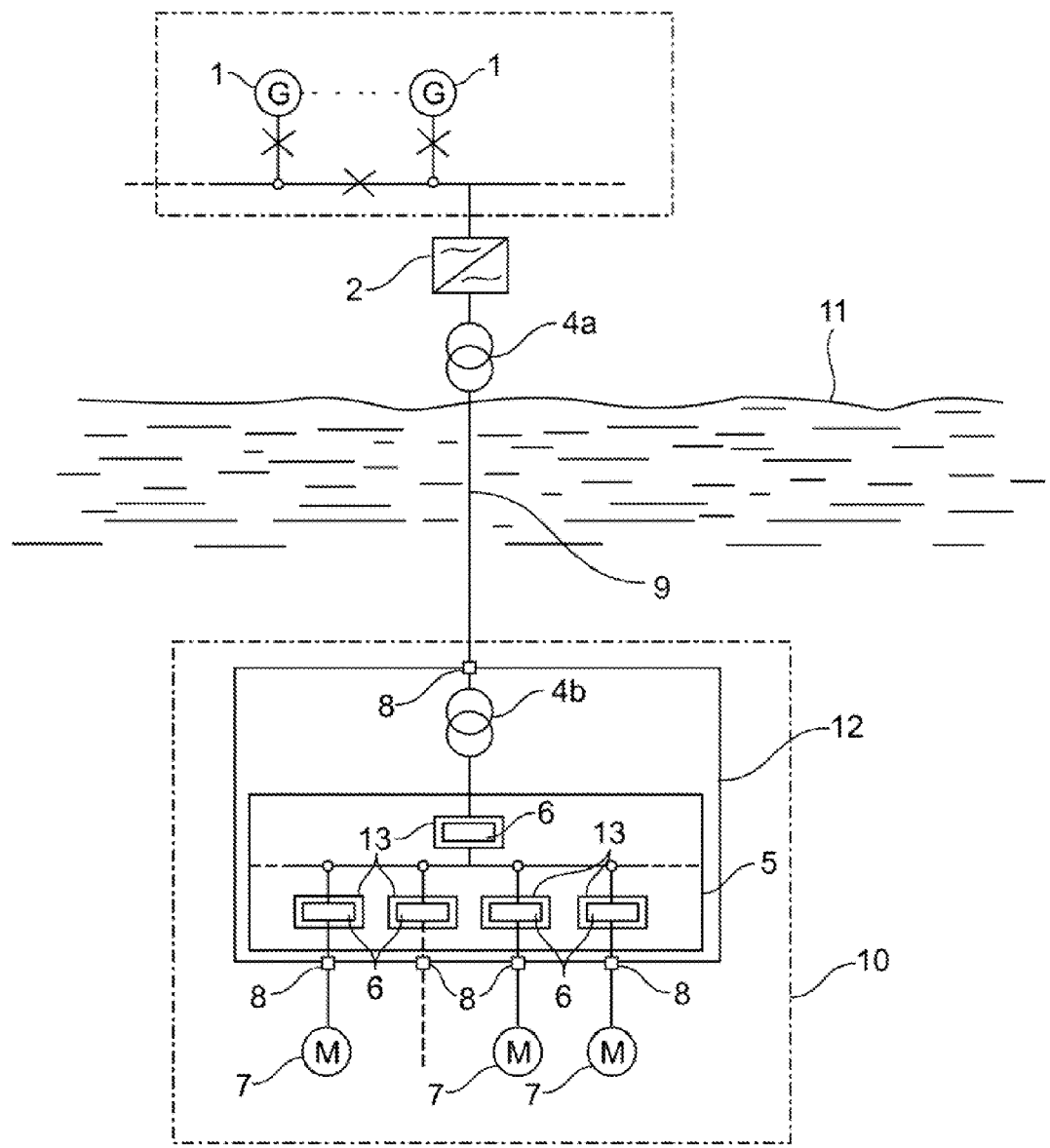
FIG. 10A illustrates a medium-frequency ac link.
Figure 10B:
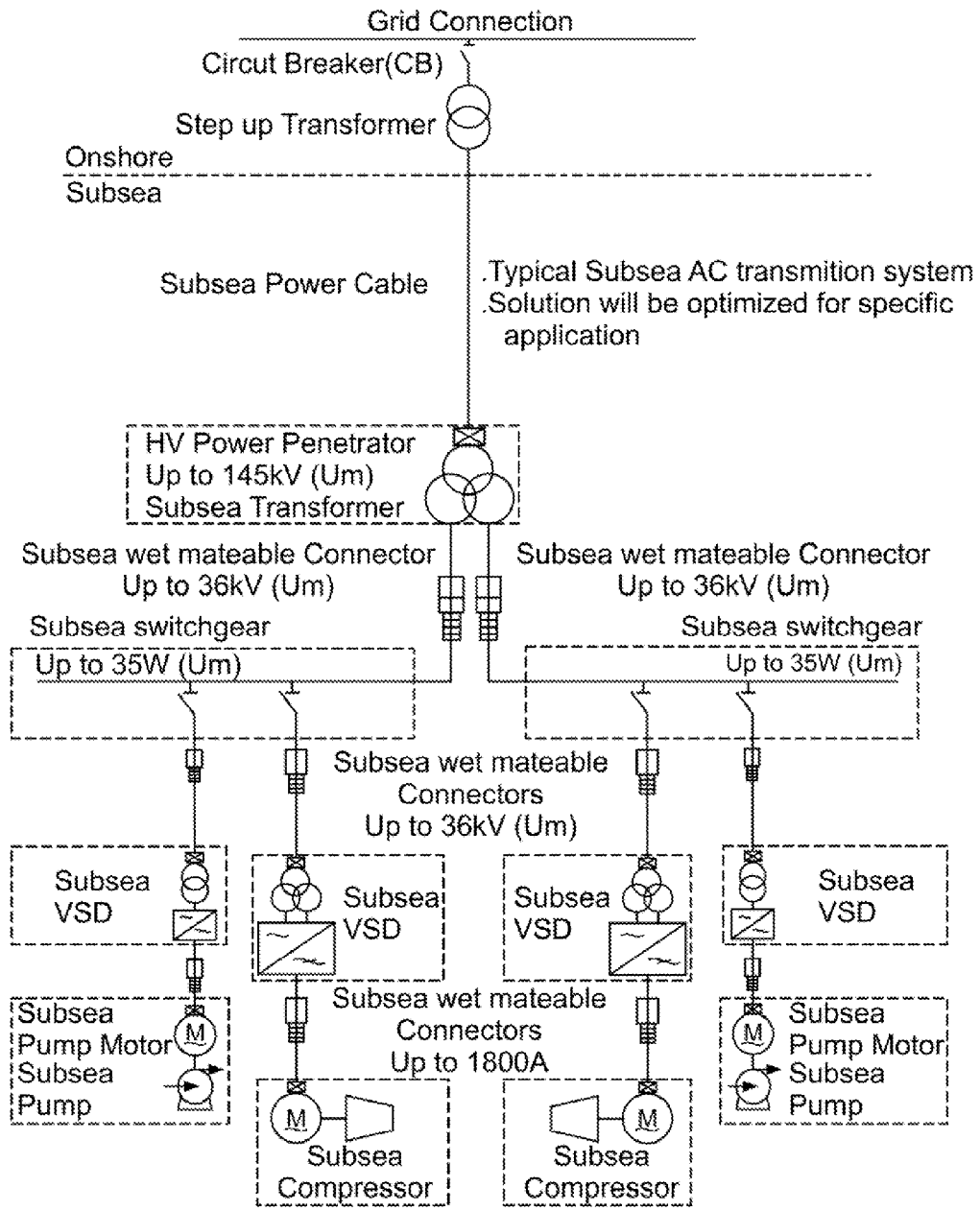
FIG. 10B illustrates a high-voltage ac link.
Figure 10C:
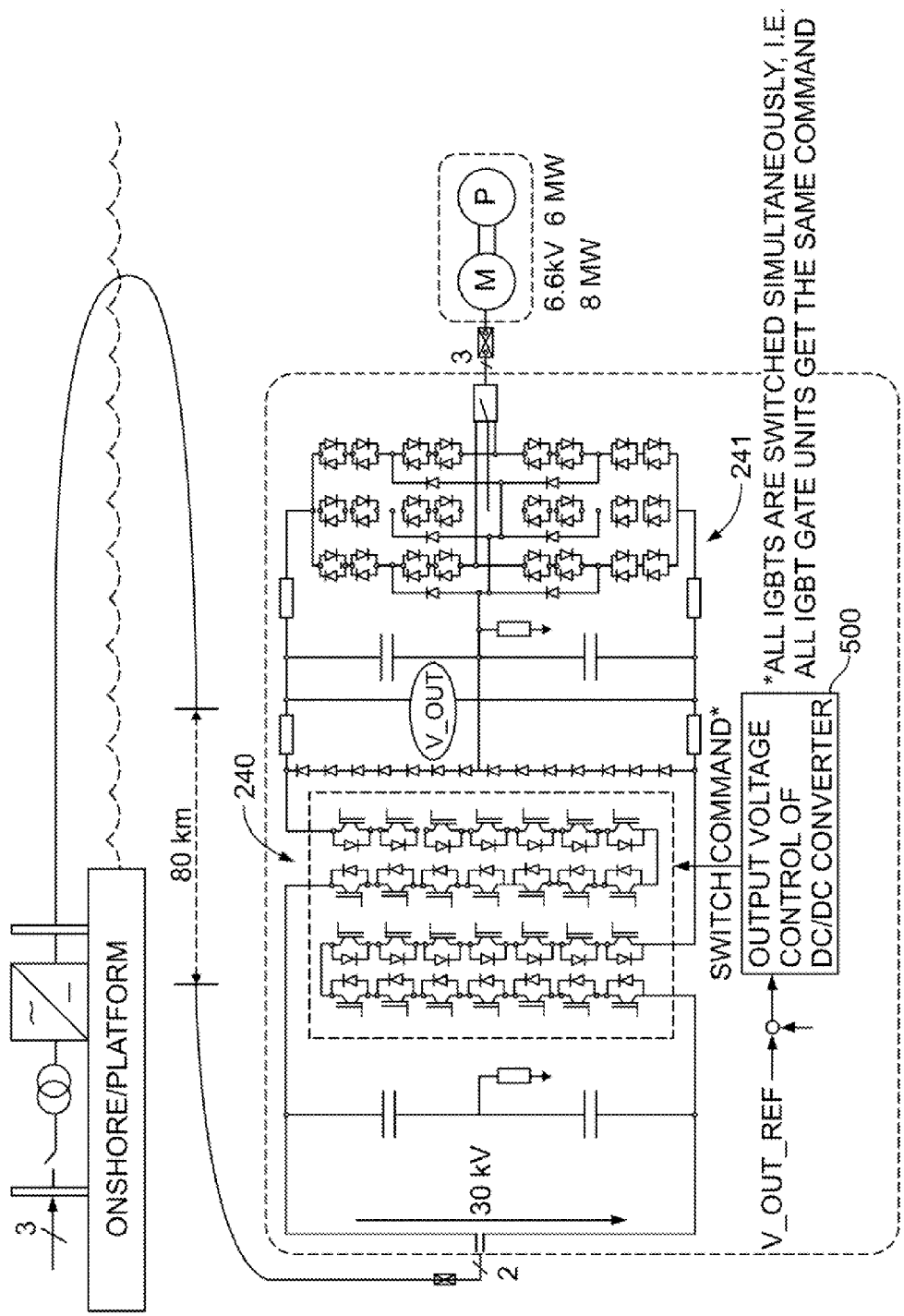
FIG. 10C shows a topology for use as a medium-voltage dc transmission link to bring power to the subsea substation.

However, due to high pressure and humidity, equipment like step-up/down transformers, protective devices and power converters, will require special housings and heavy-seals. Different topologies have been proposed to bring power to these facilities. FIG. 10A provides a medium-frequency ac link. FIG. 10B provides an HVac link. FIG. 10C shows a topology for use as a medium-voltage dc transmission link to bring power to the subsea substation.

Figure 11A:
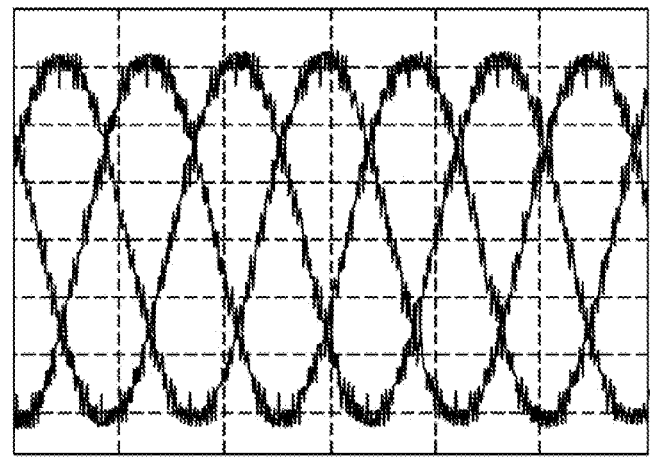
FIGS. 11A and 11B show the MF-XFMR primary and secondary voltages of the topology shown in FIG. 9A.
Figure 11B:
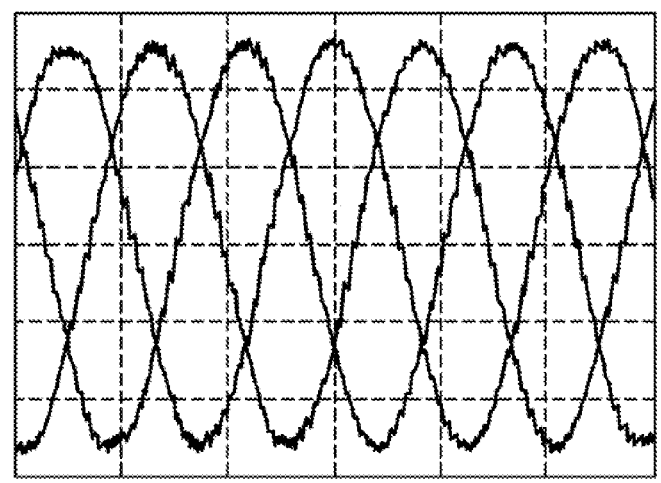
Figure 11C:
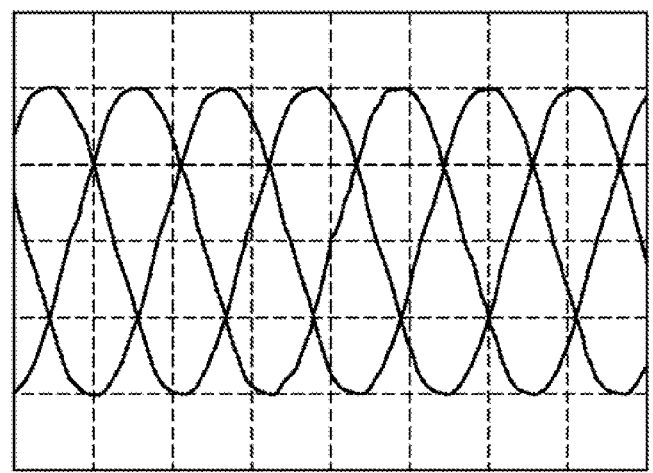
FIG. 11C shows the output voltage of the IMC shown in FIG. 9A.

Simulations in Matlab®/Simulink™ have been performed to test the PEI shown in FIG. 9A. For the simulations, it is considered that the output voltage of the IMC is 6.6 kV±5% with a fundamental-frequency of 60-Hz. The MF-XFMR voltage ratio is 23 kV/8.5 kV and a fundamental-frequency of 800-Hz. The voltage at the secondary side of the MF-XFMR, which is the input of the IMC, considers a 10% voltage drop in the series components and the IMC 86% voltage ratio. The MF-XFMR and secondary voltages are shown in FIGS. 11A and FIG. 11B respectively. The output voltage of the IMC is shown in FIG. 11C.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A power electronic interface system for connecting a plurality of alternating current transmission lines by one or more direct current transmission lines comprising:
   a first dc-link converter adapted to be connected to an alternating current transmission line, said converter increases the frequency of the alternating current received from an alternating current transmission line;
   a frequency transformer connected to said converter, said frequency transformer increases the voltage of the alternating current received from said converter;
   a modular multilevel converter that receives alternating current from said frequency transformer, said modular multilevel converter converts the alternating current received from said frequency transformer to direct current for transmission on a direct current transmission line;
   a second dc-link converter comprising a modular multilevel inverter adapted to receive direct current from a direct current transmission line, said modular multilevel converter converts the direct current received from a direct current transmission line to alternating current;
   a frequency transformer connected to said modular multilevel converter, said frequency transformer decreases the voltage of the alternating current received from said modular multilevel converter; and
   a converter connected to said frequency transformer, said converter decrease the frequency of the alternating current received from said frequency transformer for transmission to an alternating current transmission line.

2. The system of claim 1 wherein said converter is an indirect matrix converter.

3. The system of claim 1 wherein said converter is a back-to-back to converter.

4. The system of claim 1 wherein the current and voltage output waveforms of said modular multilevel converter are sinusoidal.

5. The system of claim 2 the input of said frequency transformer is unfiltered.

6. The system of claim 1 wherein said modular multilevel converter includes a plurality of sub-modules each having a capacitor, the size of said capacitor is inversely proportional to the frequency of a connected alternating current transmission line.

7. The system of claim 1 wherein said frequency transformer has a volume that is inversely proportional to the frequency of said frequency transformer.

8. The system of claim 2 wherein the input and output power of said indirect matrix converter are balanced.

9. The system of claim 2 wherein either the rectifier or the inverter of said indirect matrix converter is used to regulate power flow.

10. The system of claim 2 wherein active and reactive power injected into the grid is regulated by varying the magnitude and the angle of the indirect matrix converter.

11. The system of claim 1 wherein space vector pulse-width modulation is used to modulate the current.

12. The system of claim 2 wherein the input voltage is boosted beyond the limitation of said indirect matrix converter.

13. The system of claim 1 wherein said modular multilevel converter functions as a solid-state circuit breaker.

14. The system of claim 1 wherein said modular multilevel converter functions as a solid-state circuit breaker to control and/or block dc fault currents.

15. The system of claim 1 wherein said frequency converter is a high frequency converter.

16. The system of claim 1 wherein said frequency converter is a medium frequency converter.

17. A power distribution system comprising:
   a first alternating current transmission line connected to a second alternating current transmission line by a direct current transmission line;
   said first alternating current transmission line connected to a first dc-link converter;
   said first dc-link converter comprising an indirect matrix converter adapted to be connected to said first alternating current transmission line, said indirect matrix converter increases the frequency of the alternating current received from said first alternating current transmission line;

a frequency transformer connected to said indirect matrix converter, said frequency transformer increases the voltage of the alternating current received from said indirect matrix converter;

a modular multilevel converter that receives alternating current from said frequency transformer, said modular multilevel converter converts the alternating current received from said frequency transformer to direct current;

said direct current transmission line connected to said first dc-link converter and a second dc-link converter for transmitting direct current to said dc-link converters;

said second dc-link converter comprising a modular multilevel converter adapted to receive direct current from said direct current transmission line, said modular multilevel converter converts the direct current received from said direct current transmission line to alternating current;

a frequency transformer connected to said modular multilevel converter, said frequency transformer decreases the voltage of the alternating current received from said modular multilevel converter; and an indirect matrix converter connected to said frequency transformer, said indirect matrix converter decrease the frequency of the alternating current received from said frequency transformer for transmission to said second alternating current line.

18. The system of claim 17 wherein said modular multilevel converter includes a plurality of sub-modules each having a capacitor, the size of said capacitor is inversely proportional to the frequency of a connected alternating current transmission line.

19. The system of claim 17 wherein said frequency transformer has a volume that is inversely proportional to the frequency of said frequency transformer.

20. The system of claim 17 wherein either the rectifier or the inverter of said indirect matrix converter is used to regulate power flow.

* * * * *